Aug. 31, 1937.    H. W. ROTH    2,091,719
CURRENT INTERRUPTER FOR ELECTRIC WELDING
Filed April 11, 1931    3 Sheets-Sheet 1
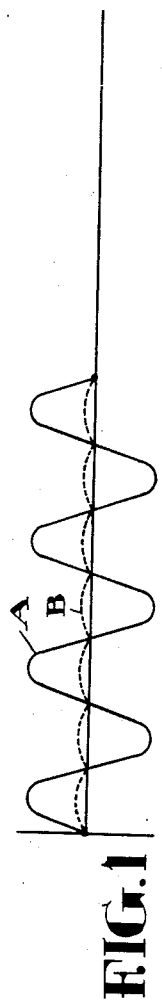
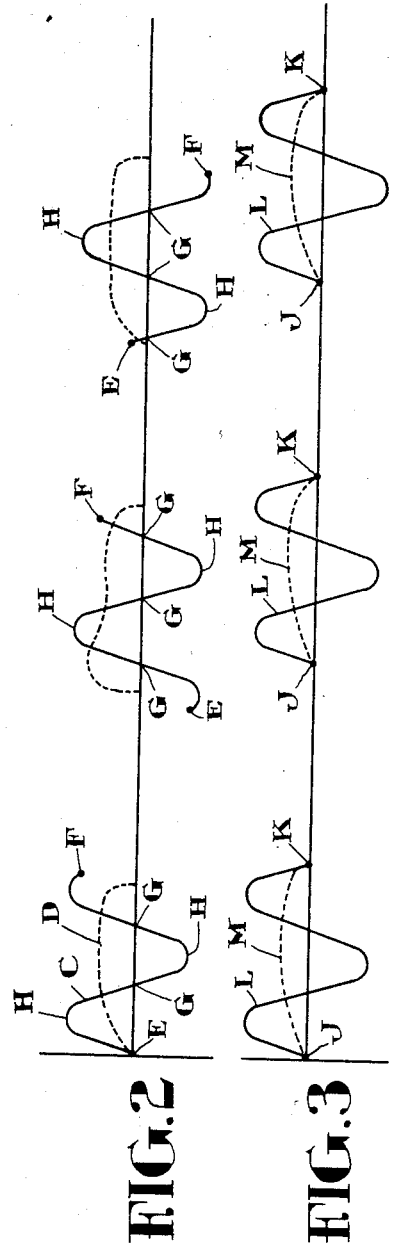
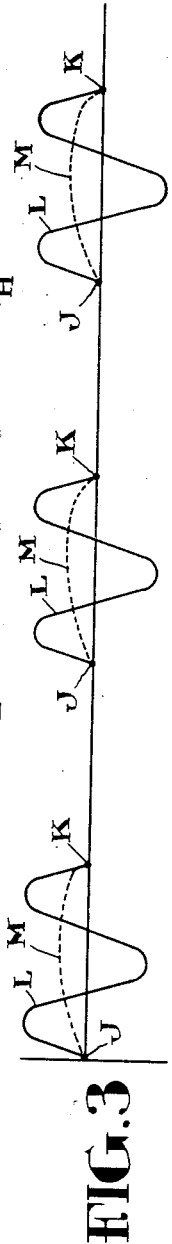
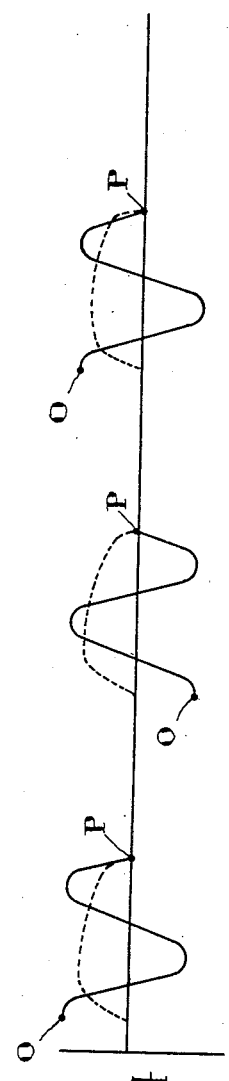
INVENTOR
HENRY W. ROTH
BY J. D. O'Connell
ATTORNEY Aug. 31, 1937.   H. W. ROTH   2,091,719
CURRENT INTERRUPTER FOR ELECTRIC WELDING
Filed April 11, 1931   3 Sheets-Sheet 2
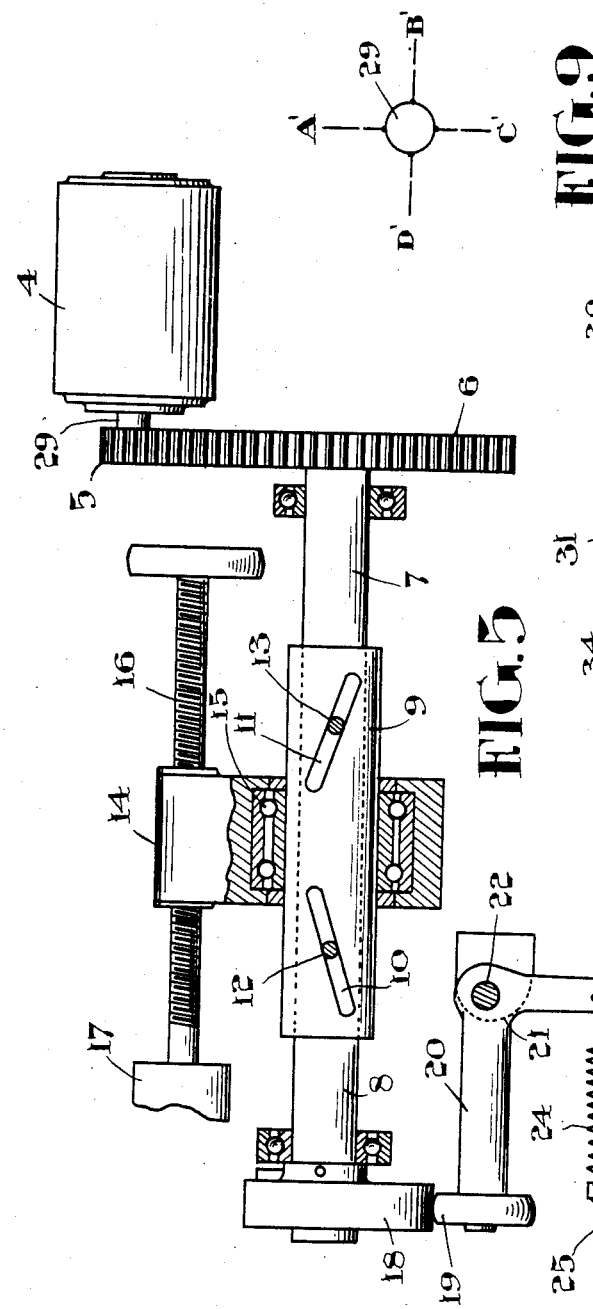
INVENTOR
HENRY W. ROTH
BY J. D. O'Connell
ATTORNEY Aug. 31, 1937.　　　　H. W. ROTH　　　　2,091,719
CURRENT INTERRUPTER FOR ELECTRIC WELDING
Filed April 11, 1931　　　3 Sheets-Sheet 3
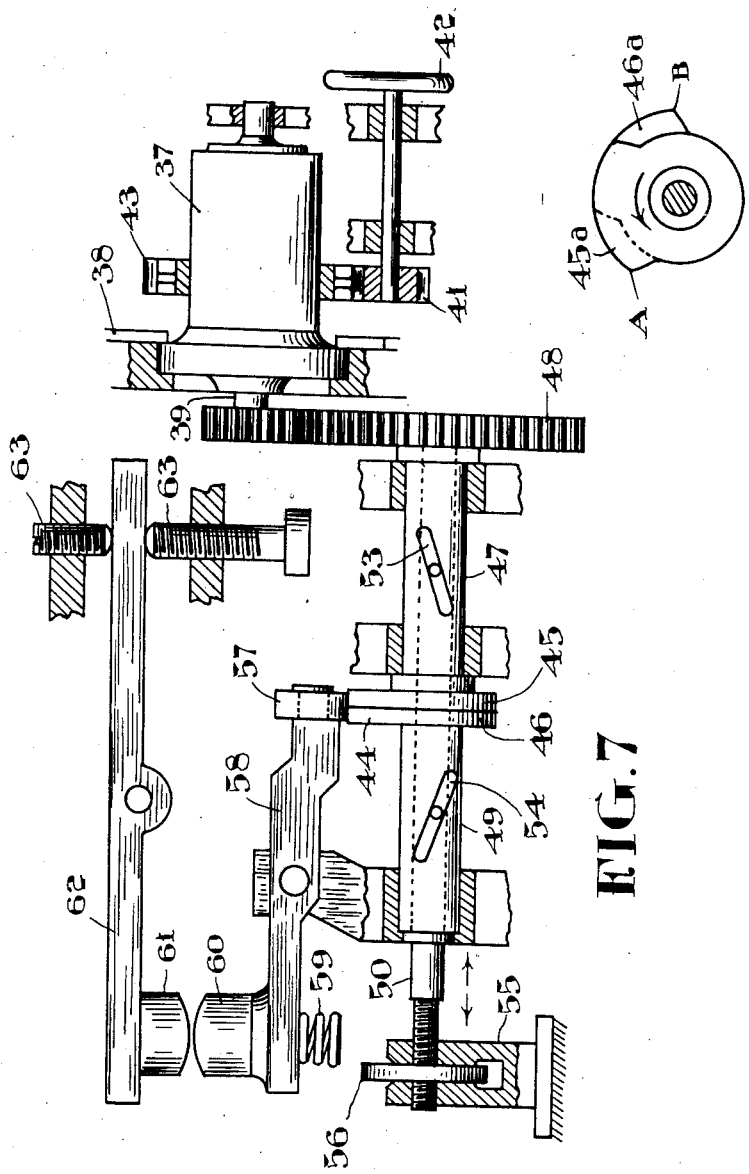
INVENTOR
HENRY. W. ROTH
BY J.D.O'Connell
ATTORNEY Patented Aug. 31, 1937

2,091,719

UNITED STATES PATENT OFFICE 2,091,719

CURRENT INTERRUPTER FOR ELECTRIC WELDING

Henry W. Roth, Montreal, Quebec, Canada

Application April 11, 1931, Serial No. 529,520
In Canada March 17, 1931

8 Claims. (Cl. 200—91)

This invention relates to resistance seam welding and particularly to a method and apparatus for controlling interruption of the welding current to ensure the production of uniform welding effects. With the aid of this invention the interruption of the circuit may be synchronized with the frequency of the current so that the opening and closing of the circuit may be accurately predetermined with respect to the sine line of the current wave in order to eliminate sparking at the interrupter contacts and to produce certain other beneficial results.

In resistance seam welding it is customary to periodically interrupt the welding current to produce a seam weld consisting of a series of overlapping spot welds. The number of spots welded per second generally varies from two to twenty depending upon the thickness of the material to be welded and the speed with which the material is traversed by the welding rolls or electrodes. When the welding apparatus is supplied with a welding current having a frequency of twenty five cycles and the speed of traverse is nine feet per minute or more, no artificial interruption of the current is necessary since the natural interruptions occurring at the zero point of the alternating wave is sufficient to produce a seam weld composed of a series of single spots, each half wave of the alternating current producing a single spot. When the speed of traverse is too slow to utilize the natural interruptions of the current, it becomes necessary to provide a special form of interrupter adjustable to vary the number of spots welded per second. When using a frequency of sixty cycles per second, this natural interruption is only feasible when the speed of traverse is eighteen feet per minute or more and this, of course, is only possible when welding sheet metal of light gauges.

Artificial interruption of welding currents as now practised has not been uniformly successful and this is especially true with reference to interrupting currents of the high amperage required for welding relatively thick sheets of metal. One of the chief difficulties encountered is that the interruptions of the circuit are very irregular and produce correspondingly irregular welding results, since these interruptions are not properly synchronized with respect to the frequency of the alternating current. With interrupters of the type now in use there is more or less continuous variation of the points along the normal sine line of the current wave at which the opening and closing of the circuit occurs and this naturally causes considerable irregularity in the welding of successive spots. At one moment the circuit may be closed at or near the zero point of the current wave, while at another moment this closure may occur when the wave is at or near its peak value. This is also true with reference to the opening of the circuit and results in a correspondingly irregular application of heat in the welding of successive spots which is particularly detrimental to the successful welding of relatively thick sheets of metal.

Another disadvantage incident to the use of prevailing types of interrupters is that in the interruption of high amperage currents sparking occurs at the interrupter contacts and the resulting heating effect tends to promote the maintenance of relatively heavy arcs between these contacts and seriously interferes with the proper functioning of the welding apparatus.

One of the objects of the present invention is to provide a method and apparatus whereby the rapid interruption of a high frequency current may be conveniently controlled to supply the electrodes with successive welding impulses of uniform characteristics and at regular intervals accurately synchronized with respect to the frequency of the current wave to produce uniform welding effects and to prevent sparking at the interrupter contact.

Another object of this invention is to provide means whereby the opening and closing of the circuit may be adjusted with reference to the frequency of the current so as to occur regularly at selected points along the sine line of the current wave. This adjustment provides for alterations of the secondary induction to suit the requirements of the material to be welded and the type of welding apparatus employed.

Another object of this invention is to provide means whereby the opening and closing of the circuit to occur regularly at selected points along the sine line of the current wave may be adjusted simultaneously or independently.

A further object of this invention is to provide means whereby the opening of the circuit at regular intervals is timed to coincide with the zero point in the sine line of the current wave in order to eliminate sparking at the interrupter contact. This enables high amperage currents to be successfully interrupted with great rapidity and makes possible the high speed welding of thick sheets to produce a tight seam weld consisting of a series of single spot welds.

In the preferred application of the invention the separation of the interrupter contacts is timed to coincide with the zero point of the current wave so that the natural interruption of the current is practically simultaneous with the artificial interruption and prevents sparking at the interrupter contacts. Regular recurrence of the artificial interruption of the current at a selected point in the sine line other than the zero point is also contemplated by this invention, but does not give the same protection against sparking or arcing of the current at the interrupter contacts. The closing of the circuit is also timed to occur regularly at any selected point in the sine line of the current wave. In actual practice the best results are obtained when both the opening and closing of the circuit are timed to occur regularly at or near the zero point of the sine line. Experiments have shown that when the circuit is closed when the current is at or near the maximum value the amperage is nearly 100% higher than when the closure of the circuit occurs near the zero point of the sine line, although the welding heat produced in the first instance is not 100% greater than that produced in the second instance. It will, therefore, be apparent that the efficiency and economy of this invention is increased when the circuit is closed at or near the zero point of the sine line since the phase displacement is lower. Moreover, undesirable fluctuations of the current and the development of higher harmonics is naturally favored when the closure of the circuit occurs at or near the maximum value. Consequently, it will be seen that the timing of the closing of the circuit independently of the timing of the opening or interruption of the circuit is a very important feature of the present invention.

Proceeding now to a more detailed discussion of the invention, reference will be had to the accompanying drawings, wherein I have shown several different forms of apparatus suitable for carrying the invention into practical effect. Since the use of such apparatus in connection with known types of welding machines presents no problem to those skilled in the art, the present disclosure will be confined solely to the construction and operation of my improved apparatus and to the advantages to be derived therefrom.

In these drawings,

Fig. 1 is a curve diagram illustrating the welding effect produced by a seam welding machine operated without artificial interruption of the welding current.

Fig. 2 is a curve diagram illustrating the welding effect produced by artificial interruption of the welding current as heretofore practised.

Figs. 3 and 4 are curve diagrams illustrating different welding effects capable of being produced in accordance with the present invention.

Fig. 5 is a more or less diagrammatic view of one form of interrupter capable of being used in accordance with the present invention to produce the welding effects represented in Figs. 3 and 4.

Fig. 6 is a view showing a differential gear mechanism which may be substituted for the sleeve and pin adjusting means shown in Fig. 5.

Fig. 7 is a diagrammatic view of a modified type of interrupter mechanism which may be used in lieu of that shown in Figs. 5 and 6.

Fig. 8 is a detail view showing certain cam members appearing in Fig. 7.

Fig. 9 is a diagrammatic view illustrating certain points on the shaft of the interrupter operating motor which are predetermined to correspond to certain points in the cycle of the alternating current.

In order to make clear the operating principle of the present invention, reference will be had initially to the comparative diagrams appearing in Figs. 1 to 4 inclusive. Fig. 1 shows the effect produced when a seam welding machine is operated without artificial interruption of the current. In this figure A designates the current wave and B the temperature of the weld, and it will be observed that each half wave produces a single spot weld. In practice these spots overlap each other to an extent depending upon the speed with which the work is traversed by the welding rolls or electrodes. As indicated at B the application and intensity of the heat applied in welding successive spots is substantially constant and produces welds of uniform characteristics. It is, however, possible to maintain this operating condition only when the speed of traverse is sufficient to utilize the natural interruptions of the current to produce the desired number of spots. For instance, when welding thick sheets of metal with a current having a frequency of sixty cycles the speed of traverse is too slow to utilize the natural interruptions of the current and it is necessary to resort to artificial interruption.

Fig. 2 shows the effect produced by artificial interruption of the current as heretofore practiced. In this figure the current wave is represented at C and the welding temperature at D. E represents the points along the sine line at which the closing of the circuit occurs while F represents the point along the sine line at which the interrupter contacts are separated to open the circuit. It will be observed here that the welding of successive spots is very irregular due to the changing relation of the points E and F with respect to the zero points G and the peak points H of the current wave. The welding heat is produced slowly by closure of the circuit at or near the zero point G while a relatively fast and heavy production of the welding heat results from closure of the circuit when the current is at or near the peak value represented at H. This lack of uniformity in the application of the welding heat is naturally reflected in the characteristics of successive welds and is not conducive to successful operation especially when dealing with the welding of relatively thick sheets of metal. Another disadvantage due to this irregular method of interruption is the promotion of sparking and arcing of the current at the interrupter contacts.

Fig. 3 shows the welding results produced by one method of interruption practiced in accordance with the present invention. In this figure J represents the points at which the circuit is closed and K the points at which the circuit is opened along the sine line of the current wave L. M indicates the welding temperature. The conditions here represented are obtained by causing the opening and closing of the circuit to coincide with predetermined zero points along the sine line of the current wave. This results in the slow and smooth production of uniform welding heat in the welding of successive spots so that the characteristics of the welds are substantially uniform along the line of the seam. In this instance three half waves of the current are utilized in welding each spot.

Fig. 4 shows the welding results produced by a somewhat different method of interruption practiced in accordance with this invention. As shown in this figure the closing of the circuit is timed to occur at the points O in the sine line of the current wave P while the opening of the circuit is timed to occur at the points R. In this instance each opening of the circuit coincides with a zero point in the sine line as in Fig. 3, but the closing of the circuit occurs when the current is at the maximum value so that there is a rapid and heavy production of heat which is maintained substantially uniform in the welding of successive spots.

In order to accurately predetermine the interruptions of the current to produce the effects represented in Figs. 3 and 4 I have found it necessary to design a special type of synchronized interrupter, one form of which is shown in Fig. 5. In this figure 4 designates a synchronous motor which, in practice is connected to operate in synchronism with the alternations of the current supplied to the welding machine (not shown). This motor is utilized to drive a shaft 7 by means of the gears 5 and 6. These gears are suitably proportioned so that the number of revolutions per second imparted to the shaft 7 has a definite relation to the alternations of the welding current as hereinafter described. Shaft 7 is connected to a shaft 8 by a special form of coupling which permits relative angular displacement of the two shafts to be conveniently varied. This coupling comprises a sleeve 9 fitting over the adjacent ends of the shafts 7 and 8 and provided with inclined slots 10 and 11. A pin 12 is fixed to the shaft 8 to engage in the slot 10 and a similar pin 13 is fixed to the shaft 7 to engage in the slot 11. Sleeve 9 is rotatably mounted in a suitable supporting member 14 and is held against longitudinal movement relative to said supporting member by a suitable arrangement of the component parts of the ball bearing 15. The sleeve supporting member 14 is free to move along the length of a non-travelling rotary adjusting screw 16 in threaded engagement therewith. The screw 16 may be supported in any suitable manner as generally indicated at 17. When the member 14 and the sleeve 9 are shifted to the right or left in response to actuation of the screw 16 the slots 10 and 11 co-act with the pins 12 and 13 to vary the angular relation of the shafts 7 and 8.

A cam 18 is fixed to the free end of the shaft 8 and is adapted to engage a roller 19 carried by the arm 20 of a bell crank lever 21. The bell crank lever is pivotally mounted as indicated at 22 and has its remaining arm 23 connected by a spring 24 to a stationary bracket 25. The lever arm 23 carries the movable interrupter contact 26 arranged to cooperate with a stationary but adjustable contact 27 carried by an adjusting screw 28 threaded through the bracket 25. When the lift of the cam 18 engages the roller 19 the contacts 26 and 27 are separated as shown in Fig. 5. When the cam lift passes out of engagement with the roller 19 the contacts 26 and 27 are engaged by the spring 24 which also serves to hold the roll against the peripheral edge of the cam.

When a frequency of sixty cycles is applied to the welding machine the motor 4 makes 1800 revolutions per minute. Certain points on the motor shaft 29 are predetermined to correspond to certain points in the sine line of the alternating current as indicated in Fig. 9. Point A' corresponds to the first zero point in the sinus line. Point B' is located at an angle of 90° to the right of point A' and corresponds to the initial maximum value reached by the current wave. Point C' is located diametrically opposite point A' and corresponds to the second zero point in the sinus line. Point D' is located midway between points A' and C' and diametrically opposite point B' and corresponds to the second maximum value reached by the current wave. Consequently, one complete revolution of the motor corresponds to four half waves or two complete alternations of the current. Assuming that the motor gear 5 is provided with 25 teeth and the gear 6 is provided with 50 teeth it follows that the shaft 7 will be operated at the rate of 15 revolutions per second so that shaft 7 makes one complete revolution while eight half waves of current are supplied to the welding machine. Since the circuit closing and interrupting movements of the contacts 26 and 27 is controlled by the rotation of shaft 8 it is possible to provide for opening of the circuit exactly in the zero point of the sine line by adjusting the relative angular displacement of the two shafts 7 and 8 as this angular displacement of the two shafts directly controls the timing of the circuit interruption with respect to the position of the motor shaft 29 and the sine line of the current wave. When the welding machine is in operation the relative angular displacement of the two shafts may be conveniently adjusted by operation of the adjusting screw 16 to eliminate sparking or arcing of the current at the interrupter contacts.

Instead of adjusting the relative angular displacement of the shafts 7 and 8 by means of the sleeve and pin arrangement shown in Fig. 5 I may employ the differential gear mechanism shown in Fig. 6. In the last mentioned figure there is shown a casting 30 fixed to revolve with the shaft 7 and carrying a revolubly mounted pinion 31. This pinion 31 meshes with pinions 32 and 33 carried by the shaft 8. The pinion 32 is fixed to rotate with the shaft 8 but the pinion 33 is loosely mounted thereon and is secured to a worm wheel 34 meshing with a worm 35. Turning of the worm 35 through any suitable form of hand operated mechanism (not shown) has the effect of varying the relative angular displacement of the shafts 7 and 8 as will be readily understood from an inspection of Fig. 6.

In connection with the opening of the circuit in accordance with this invention it is highly important that the cam and other components of the interrupter be designed so that the opening of the circuit takes place during the time required for the sine line of the current wave to pass through the region of the zero point. All of the interrupting mechanism herein described are, therefore, designed to eliminate vibration, slow opening of the circuit and other factors which interfere with accurate synchronizing of the interruptions with reference to the frequency of the current. In connection with the particular interrupter mechanism described in the foregoing it may be explained that the design of the cam 18 is such that the circumferential way of the shaft 8 is at a minimum during the moment of separating the contacts 26 and 27. It will also be observed that the contact 27 in its adjusted position presents an absolutely fixed point for engagement with the contact 26 which is engaged therewith by the spring 24 so that there is no relative movement when the contacts are in circuit closing position. As soon as the lift of the cam 18 engages the roll 19 the contacts are separated instantly and without vibration. The peripheral design of the cam is such that the separation of the contacts is effected within the desired period of time by engagement of the cam lift with the roller 19. The total opening of the contacts is preferably only about $\tfrac{1}{16}''$ to $\tfrac{1}{8}''$.

In the foregoing discussion I have dealt solely with the adjustments necessary for properly timing the opening of the circuit in relation to the sine line of the current wave. For reasons previously explained herein timing of the closing of the circuit is of nearly equal importance. This timing of the closing of the circuit is provided for in the construction shown in Fig. 5 by the adjustable mounting of the contact 27 and its supporting screw 28 which permits the contact 27 to be adjusted horizontally when the welding apparatus and the interrupter are in operation. The adjustment of the contact 28 to time the closing of the circuit will obviously cause some slight alteration in the timing of the opening of the circuit as previously fixed by adjustment of the shafts 7 and 8 but this can be immediately corrected by a slight turning movement of the adjusting screw 16. However, a somewhat more convenient and accurate arrangement for making both adjustments is shown in Figs. 7 and 8. In this arrangement the motor 37 is a synchronous motor and is mounted in special bearing brackets 38 which permit angular adjustments of the stator shell relative to the rotor axle 39 and the drive gear 40 fixed to said axle. This adjustment determines the relation of the drive gear 40 with respect to the sine line of the current wave and is conveniently effected by means of a pinion 41 equipped with an operating handle 42 and meshing with a ring gear 43 fixed to the stator shell of the motor. The operating cam generally indicated at 44 consists of two cam members 45 and 46 provided, respectively, with cam lifts 45a and 46a. The cam member 45 is fixed to rotate with a shaft 47 driven by a gear 48 meshing with the motor gear 40. The cam member 46 is fixed to rotate with a shaft 49 aligned with the shaft 47. A longitudinally movable rod 50 is slidably mounted in both of the shafts 47 and 49 and carries a pair of pins 51 and 52 operating in the inclined slots 53 and 54. One end of the rod 50 projects beyond the shaft 49 and is slidably mounted in a bracket 55. An adjusting nut 56 is threadedly engaged with the projecting end of said rod and is held against travelling movement between opposing portions of the bracket 55.

The cam members 45 and 46 are both arranged to engage a roller 57 fixed to one end of an intermediately pivoted lever 58. The other end of the lever is engaged by a spring 59 and carries the movable interrupter contact 60. The stationary interrupter contact 61 is carried by one end of a second intermediately pivoted lever 62. The remaining end of the lever 62 is fitted between a pair of adjusting screws 63 which provide a convenient means for adjusting the distance between the contacts and preventing vibration of the contact 61.

In the use of the interrupter mechanism just described the elimination of arcs and the timing of the opening of the circuit is effected by operating the pinion 41 to fix the angular relation of the drive gear 40 with reference to the sine line of the alternating current. The moment of closing the circuit in relation to the sine line is then independently adjusted by actuating the nut 56 to effect relative angular displacement of the cam members 45 and 46 through the medium of the pin and slot connections provided between the shafts 47 and 49 and the movable rod 50. The manner in which the closing of the circuit is affected by angular displacement of the cam members will be understood from the following reference to Fig. 8. Assuming the cam members are rotated in the direction of the arrow it is obvious that the point "a" on the cam lift 45a controls the opening of the circuit while the point "b" on the cam lift 46a controls the closing of the circuit. When the cam members are relatively displaced to shift the point "b" closer to the point "a", the gear 48 being manually held against turning, the total length of the cam lift surface provided for engagement with the roller 57 is decreased and permits earlier closure of the interrupter contacts. This adjustment does not alter the timing of the separation of the contacts to open the circuit since the relation of the point "a" to the motor axle remains fixed and is not affected by the relative angular displacement of the cam members. Obviously, the relative adjustment of the cam lift points "a" and "b" to shorten or lengthen the total cam lift surface presented for engagement with the roller 57 also makes it possible to alter the relation of the total time of interruption with respect to the welding time and this is an important feature of control with respect to successful welding of different kinds and thicknesses of material.

In the foregoing description I have referred solely to the use of the invention in connection with resistance seam welding apparatus but it will be obvious that the invention is also useful in connection with automatic spot welding apparatus and that various modes of applying the underlying principle of the invention may be resorted to within the scope of the appended claims.

Having thus described my invention, what I claim is:—

1. A current interrupter for electric welding comprising a synchronously driven, high speed, actuating device with means actuated thereby to effect a quick break in an alternating current circuit at the approximate time of zero current value, and means to establish the rate of interruptions at a rate less than that at which the cycle of operations of the actuating device takes place.

2. A circuit interrupter for electric welding comprising a synchronously driven, high speed, actuating device with means actuated thereby to effect a quick break in an alternating current circuit at the approximate time of zero current value, and means to cause interruptions to take place at a rate which is a submultiple of the rate at which the actuating device is operated.

3. A current interrupter for electric welding comprising a circuit breaker device, a synchronously actuated, high speed, actuating device for said circuit breaker adapted to effect a quick break in an alternating current circuit at the approximate time of zero current value, means to establish the rate of interruptions at a rate less than that at which the cycle of operations of the actuating device takes place, and means to control the ratio of the circuit open interval to the circuit closed interval for each cycle of operation of the interrupter.

4. A current interrupter for electric welding comprising a circuit breaker, a synchronously operated, high speed, actuating device for said circuit breaker adapted to effect a quick break in an alternating current circuit, and synchronously operated control means for establishing the rate of current interruptions per minute at less than that at which the cycle of operation of the actuating device takes place, and for establishing the ratio of current dwell to current interruption.

5. A circuit interrupter for electric welding comprising a circuit breaker, a synchronously driven, high speed, actuating device for said circuit breaker adapted to effect a quick break in an alternating current circuit at the approximate time of zero current value, and means automatically and periodically to render said actuating device ineffective to break the circuit for one or more cycles of its operation, thereby to establish a rate of current interruptions less than the rate at which the cycle of operations of the actuating device takes place.

6. A circuit interrupter for electric welding comprising a circuit breaker, a synchronously driven, high speed, actuating device for said circuit breaker adapted to effect a repeated succession of quick breaks in an alternating current circuit at the approximate time of zero current value, and a breaker controller actuated periodically in timed relation to the actuating device for rendering the latter ineffective to break the circuit for one or more cycles of its operation, thereby to establish a rate of current interruptions less than the rate at which the cycle of operations of the actuating device takes place.

7. A circuit interrupter for an alternating current circuit, the same comprising, in combination, circuit breaking contacts, a synchronously driven, high speed, actuating device related to said contacts to act thereon and effect a succession of repeated quick breaks in said circuit, means to adjust said device to cause the breaks to occur at the approximate time of zero current value, a controlling mechanism related to the actuating device to render the latter ineffective to break the circuit for one or more cycles of operation of the actuating device, and means for synchronously driving said controlling mechanism.

8. A circuit interrupter for an alternating current circuit, the same comprising, in combination, circuit breaking contacts, a synchronous motor connected with said circuit, an actuating device driven by said motor and related to said contacts to act thereon and effect a succession of repeated quick breaks in said circuit, means to adjust said device to cause the breaks to occur at the approximate time of zero current value, a controlling mechanism related to the actuating device to render the latter ineffective to break the circuit for one or more cycles of operation of the actuating device, and means for driving said controlling mechanism from said motor.

HENRY W. ROTH.